(12) United States Patent
Olofsson et al.

(10) Patent No.: US 9,338,708 B2
(45) Date of Patent: May 10, 2016

(54) METHOD AND APPARATUS OF COMMUNICATION

(71) Applicant: Huawei Technologies Co., Ltd., Shenzhen (CN)

(72) Inventors: Henrik Olofsson, Kista (SE); Xuejun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/478,619

(22) Filed: Sep. 5, 2014

(65) Prior Publication Data

US 2014/0378137 A1    Dec. 25, 2014

Related U.S. Application Data

(63) Continuation of application No. 13/162,318, filed on Jun. 16, 2011, now Pat. No. 8,849,318, which is a continuation of application No. PCT/CN2009/070321, filed on Jan. 24, 2009.

(51) Int. Cl.
| | |
|---|---|
| *H04W 36/30* | (2009.01) |
| *H04W 36/00* | (2009.01) |
| *H04W 24/02* | (2009.01) |
| *H04W 68/00* | (2009.01) |
| *H04W 48/16* | (2009.01) |

(52) U.S. Cl.
CPC .......... *H04W 36/0083* (2013.01); *H04W 24/02* (2013.01); *H04W 68/00* (2013.01); *H04W 48/16* (2013.01)

(58) Field of Classification Search
CPC .................................................... H04W 36/30
USPC .................................. 455/436, 450, 447, 458
See application file for complete search history.

(56) References Cited

U.S. PATENT DOCUMENTS

| | | | |
|---|---|---|---|
| 7,778,653 B2 | 8/2010 | Narasimha | |
| 2003/0109254 A1 | 6/2003 | Motegi et al. | |
| 2005/0282562 A1* | 12/2005 | Lee et al. ...................... | 455/458 |

(Continued)

FOREIGN PATENT DOCUMENTS

| | | |
|---|---|---|
| CN | 101138266 A | 3/2008 |
| CN | 101237683 A | 8/2008 |

(Continued)

OTHER PUBLICATIONS

Nokia Siemens Networks, "Report on [63bis_LTE_B14] ANR reporting" Agenda Item 5,7.1, 3GPP TSG-RAN WG2 Meeting #64, Prague, Czech Republic, Nov. 10-14, 2008, R2-086272, 2 pages.

(Continued)

*Primary Examiner* — Chuck Huynh
(74) *Attorney, Agent, or Firm* — Brinks Gilson & Lione

(57) ABSTRACT

A method for parameter management in a wireless cellular communications system, which includes a first base station and a second base station equipped for communications in the communications system, records one or more paging area parameters broadcast by a base station serving a neighbor cell of a cell served by the first base station. The paging area parameters form part of a relation of the first base station and are maintained by the first base station. The method further includes transferring the recorded paging area parameters from the first base station to the second base station.

13 Claims, 7 Drawing Sheets

(56) References Cited

U.S. PATENT DOCUMENTS

| | | | |
|---|---|---|---|
| 2006/0009241 | A1 | 1/2006 | Ryu et al. |
| 2006/0014550 | A1 | 1/2006 | Ryu et al. |
| 2008/0194252 | A1 | 8/2008 | Narasimha |
| 2009/0131084 | A1 | 5/2009 | Comstock et al. |
| 2009/0170528 | A1 | 7/2009 | Bull et al. |
| 2009/0280811 | A1* | 11/2009 | Kida et al. .................. 455/436 |
| 2010/0075681 | A1 | 3/2010 | Olofsson et al. |

FOREIGN PATENT DOCUMENTS

| | | |
|---|---|---|
| CN | 101272545 A | 9/2008 |
| EP | 2369788 A1 | 9/2011 |
| KR | 20010038107 A | 5/2001 |
| WO | WO 2004/054286 A2 | 6/2004 |
| WO | WO 2007/089556 A1 | 8/2007 |
| WO | WO 2007/113457 A1 | 10/2007 |
| WO | WO 2008/025502 A1 | 3/2008 |
| WO | WO 2008/054668 A2 | 5/2008 |

OTHER PUBLICATIONS

Qualcomm et al., "Neighbor Information Exchange over X2" Agenda Item 10.1.1b, 3GPP TSG-RAN WG3#61bis, Sep. 30-Oct. 3, 2008, Prague, Czech Republic, R3-082454, 5 pages.

Qualcomm et al., "Neighbor Information Exchange over X2" Change Request, 36.423 CR rev. version 8.3.0, 3GPP TSG-RAN WG3 Meeting #61bis, Prague, Czech Republic, Sep. 30-Oct. 3, 2008, R3-082851, 14 pages.

Global System for Mobile Communications, "$3^{rd}$ Generation Partnership Project; Technical Specification Group GSM/EDGE Radio Access Network; Multiplexing and multiple access on the radio path" (Release 7) 3GPP TS 45.002, V7.7.0, May 2008, 105 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP TS 36.300, V8.6.0, Sep. 2008, 137 pages.

LTE, "$3^{rd}$ Generation Partnership Project; Technical Specification Group Core Network and Terminals; Numbering, addressing and identification" (Release 8) 3GPP TS 23.003, V8.3.0, Dec. 2008, 69 pages.

LTE, "$3^{rd}$ Generation Partnership Project; Technical Specification Group Radio Access Network; Evolved Universal Terrestrial Access Network (E-UTRAN); X2 application protocol (X2AP)" (Release 8) 3GPP TS 36.423, V8.4.0, Dec. 2008, 89 pages.

LTE, "$3^{rd}$ Generation Partnership Project; Technical Specification Group Radio Access Network; Evolved Universal Terrestrial Radio Access (E-UTRA) and Evolved Universal Terrestrial Radio Access Network (U-TRAN); Overall description" Stage 2 (Release 8), 3GPP TS 36.300, V8.7.0, Dec. 2008, 144 pages.

* cited by examiner

| Tracking Area Identification IE-ID | | ~210 |
|---|---|---|
| MCC Digit 2 | MCC Digit 1 | ~201 202 |
| MNC Digit 3 | MCC Digit 3 | ~203 205 |
| MNC Digit 2 | MNC Digit 1 | ~204 206 |
| TAC | | ~207 |
| TAC (continued) | | ~208 |
| TAC (continued if 24 bit TAC) | | ~209 |

| PCI | CGI* / RAC | PLMN-ID / LAC |
|---|---|---|
| ... | ... / ... | ... / ... |
| 19 | $CGI^*_{19}$ / $RAC_{19}$ | $PLMN\text{-}ID_{19}$ / $LAC_{19}$ |
| 20 | $CGI^*_{20}$ / $RAC_{20}$ | $PLMN\text{-}ID_{20}$ / $LAC_{20}$ |
| 21 | $CGI^*_{21}$ / $RAC_{21}$ | $PLMN\text{-}ID_{21}$ / $LAC_{21}$ |
| ... | ... / ... | ... / ... |

Fig. 5

METHOD AND APPARATUS OF COMMUNICATION

CROSS-REFERENCE TO RELATED APPLICATION

This application is a continuation of U.S. application Ser. No. 13/162,318 filed on Jun. 16, 2011, which is a continuation of International Application No. PCT/CN2009/070321, filed on Jan. 24, 2009, both of which are hereby incorporated by reference in their entireties.

TECHNICAL FIELD

This specification pertains to the technical field of parameter management of communication systems comprising a base station device or base station. This specification also pertains to the technical field of management and transfer of neighbor cell parameters, such as inter-RAT (Radio Access Technology) and paging area parameters, in a cellular wireless communications system.

BACKGROUND

Wireless communications are continuously developing. New communication systems emerge and others may disappear. During the 4G era, various communication systems such as GSM (Global System for Mobile Communications), CDMA (Code Division Multiple Access), CDMA2000, WCDMA (Wideband CDMA), UMTS (Universal Mobile Telecommunications System), HSPA (High Speed Packet Access), WiFi (Wireless Fidelity) and W-LAN (Wireless Local Area Network), UWB (Ultra Wideband), WiMAX (Worldwide Interoperability for Microwave Access), LTE (Long Term Evolution) or UTRA (Universal Terrestrial Radio Access) and LTE-Advanced or E-UTRA (Evolved UTRA) network technologies may co-exist and at least some of them potentially be accessible by a dual- or multi-mode terminal or handset. The capability of handing over traffic efficiently between heterogeneous access technologies is expected to be of particular significance for providers of communication services.

Cellular wireless communications systems provide a means of covering an area with wireless communications resources. A area to be covered by wireless services is divided into a number of smaller areas, cells, each cell being served by one or more base stations. With a great number of base stations, BSes, each base station providing services for a corresponding cell of service coverage, a great surface is covered. In e.g. UMTS and UTRA; the logical concept or representation of a base station is referred to as Node B; and in E-UL-TRA, E-UTRAN Node B or eNB. In WiMAX, it is referred to as enhanced base station. In case a wireless resource such as radio frequency spectrum is used repeatedly in more than one cell, a large service area can be covered also with a limited amount of the wireless resource.

An area covering system need keep track of a terminal or handset for communications over the system, subsequently and correspondingly referred to as an MS (Mobile Station) or SS (Subscriber Station), a UED (User Equipment Device) or UE (User Equipment), to be capable of connecting a call or delivering arriving data destined for it or its user. The tracking of circuit switched, CS, traffic and packet switched, PS, traffic need not be the same.

Considering a system providing CS services over GSM and PS services over GPRS using GSM radio technology as an example, there are a location area identifier, LAI, and a location area code, LAC, for the CS services and a routing area identifier, RAI, and routing area code, RAC, for the PS services broadcast from the base stations in a repeating cycle.

International Patent Application WO2007113457, discloses a mobile terminal with system information which enables the terminal to access one of the cells of a cellular telecommunications system. The network includes an HLR/HSS (Home Location Register/Home Subscriber Server), which, for each subscriber of the network, stores the IMSI (International Mobile Subscriber Identity) and the corresponding MSISDN (Integrated Services Digital Network) number together with other subscriber data, such as the current or last known location of the subscriber's mobile terminal.

Conventionally, the base stations are arranged in groups and each group of base stations is controlled by one MSC (Mobile Switching Centre). MSCs support communications in the circuit switched domain—typically voice calls. Corresponding SGSNs (Serving GPRS Support Nodes) are provided to support communications in the packet switched domain—such as GPRS (General Packet Radio Services) data transmissions. The MSC stores subscriber data temporarily in a location in a VLR (Visitor Location Register). In this way, therefore the particular subscriber is effectively registered with a particular MSC, and the subscriber's information is temporarily stored in the VLR associated with that MSC. The information stored on the VLR includes a TMSI (Temporary Mobile Subscriber Identification) number for identification purposes for the terminal within the MSC. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC. The SGSNs function in an analogous way to the MSCs. The SGSNs are equipped with an equivalent to the VLR for the packet switched domain.

When the HLR (Home Location Register) is interrogated by the MSC, the HLR additionally performs an authentication procedure for the mobile terminal. If the mobile terminal is deemed authenticated, the MSC requests subscription data from the HLR. The HLR then passes the subscription data to the VLR.

When a mobile terminal is in an inactive or idle state, when a calling party (whether a subscriber within the mobile telecommunications network or outside it) attempts to call a mobile terminal within the network, that mobile terminal must be paged. Paging is a process of broadcasting a message, which alerts a specific mobile terminal to take some action; for paging, to notify the terminal that there is an incoming call to be received. If the network has information on the cell where the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signaling capacity within the network.

However, typically the area covered by a single MSC and SGSN is large, and to page all the cells covered by a single MSC and SGSN would require a significant amount of paging signaling.

The problems of excessive use of signaling capacity by paging a multiplicity of cells or performing a multiplicity of frequent location updates is solved in 2G and 3G networks by dividing the coverage area of the mobile telecommunications network into a plurality of paging areas, referred to as location areas, LAs, or routing areas, RAs.

A location area relates to a particular geographical area for communications in the circuit switched domain. Typically, although not necessarily, a location area is larger than the area of a single cell but is smaller than the area covered by one MSC. Each cell within the network broadcasts data, LAI, indicative of the identity of its location area. The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update, LAU. The request includes LAI of the earlier/old location area and the terminal's current TMSI. If the MSC/VLR is the same for the new and old location areas, the network can immediately authenticate the mobile terminal and note the change of location area. However, if the mobile terminal has moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area in addition to the data mentioned above indicative of the identity of its location area. The mobile terminal uses this received data to determine when it has moved to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update, RAU. The routing area is updated correspondingly to the location area, as discussed above.

As mentioned above, GSM and UMTS mobile telecommunications networks are divided into paging areas (location areas/routing areas). The LTE network has the equivalent of location/routing areas (herein "tracking areas", TAs). Tracking area updates are performed similar to RAUs and LAUs.

In WO2007113457, a minimum set of system information is transmitted by eNodeB (evolved Node-B) of the base station that serves the cell in which the mobile terminal is located. This system information minimum set only includes a sub-set of the information that is conventionally transmitted on the BCH. The system information minimum set includes an identifier of the network, PLMN ID, and tracking area, TA, in which the cell is located, as well as information to find the RACH and to configure access to the RACH.

The system information indicator of WO2007113457 directs the mobile terminal to retrieve the system information from a store and use the system information to access the telecommunications system. This store is a store on the mobile terminal which stores a plurality of respective system data. The system information indicator received on the BCH directs the mobile terminal to retrieve and use a particular one of the stored system data. It is not necessary, therefore, for all the system data to be transmitted by the telecommunication system to the mobile terminal. However, these system data can be transmitted by the telecommunications system when desired; for example, in order to update the system data. Generally, however, this updating will not be performed using the BCH. The system data stored on the mobile terminal may be pre-stored thereon when the mobile terminal is manufactured.

In e.g. WiMAX, usually plural cells are, similar to WO2007113457, grouped into a PA (Paging Area) or PG (Paging Group) for paging of mobile stations. An MS receiving the location area and routing area information may thereby detect an area code change when its user moves across paging area borders.

3rd Generation Partnership Project, Technical Specification Group GSM/EDGE Radio Access Network, 'Multiplexing and multiple access on the radio path,' 3GPP TS 45.002 V7.7.0, France, May 2008, describes transmission of system information in a multi-frame structure. E.g. system information type 13, SI13, is related to GPRS. An SI13 message is sent on a normal broadcast control channel, BCCH Norm, or a BCCH Ext, an additional downlink channel obtained by taking away blocks normally used for paging/access grant. In the case that the message is sent on the BCCH Norm, it is sent at least once within any of 4 consecutive occurrences of TC=4. If sent on BCCH Ext, it is sent at least once within any of 4 consecutive occurrences of TC=5. The type code, TC, is a sequence number within a multi-frame comprising 52 frames.

3rd Generation Partnership Project, Technical Specification Group Core Network and Terminals, 'Numbering, addressing and identification,' 3GPP TS 23.003 V8.3.0, France, December 2008, defines assigning principles and identification plans. In section 4.3, it illustrates CGI (Cell Global Identification), see FIG. 1, and BSIC (Base Station Identify Code). CGI comprises MCC (Mobile Country Code) identifying the country in which the PLMN (Public Land-Mobile Network) is located, MNC (Mobile Network Code) identifying PLMN in that country, LAC (Location Area Code) identifying a location area within a PLMN and CI (Cell Identity). RAC occupies 1 octet and LAC occupies 2 octets. The 3GPP specification also mentions a TAC occupying 16 bits.

International Patent Application WO2004054286A2, describes a GSM for seamless operation with WCDMA networks. Additional capabilities are defined for GSM and specified in Release 99 version of the GSM standard. One of these additional capabilities is the ability for a GSM network to broadcast information for neighboring WCDMA cells. This broadcast information allows dual-mode terminals operating on the GSM network to learn of the presence of WCDMA cells. Moreover, the broadcast information includes cell-specific information that may be used by the dual-mode terminals to quickly acquire the WCDMA cells. Such cell-specific information includes, for each WCDMA cell, (1) the frequency and primary scrambling code used by the WCDMA cell and (2) whether or not diversity mode is employed by the WCDMA cell. WCDMA and GSM each provides a "cell reselection" process whereby a terminal operating on one network determines a suitable cell in another network from which it plans to receive available services.

3rd Generation Partnership Project, Technical Specification Group Radio Access Network, 'Evolved Universal Terrestrial Radio Access (E-UTRA) and Evolved Universal Terrestrial Radio Access Network (E-UTRAN),' 3GPP TS 36.300 V8.7.0, France, December 2008, describes an ANR (Automatic Neighbor Relation) function relying upon cells broadcasting their identity on a global level, ECGI (E-UTRAN Cell Global Identifier). For inter-RAT and inter-Frequency ANR, each cell contains an Inter Frequency Search list. This list contains all frequencies that shall be searched. During connected mode, an eNB can instruct a UE device to perform measurements and detect cells on other RATs/frequencies. FIG. 3 illustrates schematically the inter-RAT/inter-frequency ANR function in case of a UTRAN detected cell (307). Anticipating a base station (302) operating according to UTRAN access technology and providing radio coverage over a cell (307), a base station (301) operating according to E-UTRAN or LTE access technology and providing radio coverage over a cell (306), and a UE device (303) capable of operating according to both E-UTRAN and UTRAN access technologies, the eNB (301) first instructs (311) the UE device (303) to look for neighbor cells (307) in the target RATs/frequencies. To do so, the eNB (301) may need to schedule appropriate idle periods to allow the UE device (303) to scan broadcast channels of all cells in the target RATs/frequencies. Second, the UE device (303) reports (312) PCI (Physical Cell-ID) of the detected cells (302, 307) in the target RATs/frequencies. A reserved range of PCI is only applicable to the frequency of the PLMN where the UE device received it. The PCI is defined by the carrier frequency and PSC (Primary Scrambling Code) in case of UTRAN FDD (Frequency Division Duplex) cell, the carrier frequency and the cell parameter ID in case of UTRAN TDD (Time Division Duplex) cell, and the Band Indicator+BSIC (Base Station Identity Code)+BCCH ARFCN (Absolute Radio Frequency Channel Number) in case of GERAN cell.

Third, when the eNB (301) receives (312) a report from the UE device (303), the eNB (301) instructs (313) the UE device (303), using the newly discovered PCI as parameter, to read (314)

ECGI, TAC (Tracking Area Code) and all available PLMN ID(s) of an inter-frequency detected cell, CGI (Cell Global Identity), LAC (Location Area Code) and RAC (Routing Area Code), in case of a UTRAN inter-RAT detected cell, and CGI and RAC of the detected neighbor cell, in case of a GERAN inter-RAT detected cell.

ECGI (E-UTRAN Cell Global Identifier) is constructed from the MCC (Mobile Country Code), MNC (Mobile Network Code) and the ECI (E-UTRAN Cell Identifier). The ECI is used to identify cells within a PLMN. ECI has a length of 28 bits and contains the eNB Identifier. The eNB Identifier is either of short length, 20 bits, which allows addressing of up to 256 cells per eNB (identifier) or of long length, 28 bits, which allows addressing of one cell per eNB. The UE device (303) ignores transmissions (313) from the serving cell 301 while finding the requested information transmitted in the broadcast channel of the detected inter-system/inter-frequency neighbor cell (302). For this purpose, the eNB (301) may need to schedule appropriate idle periods to allow the UE to read (314) the requested information from the broadcast channels of the detected inter-system/inter-frequency neighbor cells (302). Finally, the UE device (303) reports (315) detected parameters CGI, ECGI, LAC, RAC, TAC and PLMN-ID(s) as applicable.

International Patent Application WO2008054668, describes LTE tracking area updates, TAUs, and TAC (Tracking Area Code) and PLMN-ID (Public Land Mobile Network Identification) assisted optimized WTRU (Wireless Transmit/Receive Unit) cell reselection. An evolved Node-B broadcasts system information including at least one SIB (System Information Block) based at least in part on an E-UTRAN parameter response message sent by an EPC (Evolved Packet Core) network. A WTRU generates a new TAC, which represents a tracking area identification, TA-ID, of a new cell, based on the system information, and compares the new TAC to an existing TAC, which represents a TA-ID of a previous cell. The WTRU transmits to the EPC network a TAU request message including the TA-ID of the new cell. The EPC network sends either a TAU accept message or a TAU reject message to the WTRU. Example globally unique TAC is identical to TA-ID. Another example TA-ID equals the sum of PLMN-ID and TAC. Up to 24 bits are provided for TA-ID and TAC. FIG. 2 illustrates an example TA-ID information element, where each row corresponds to an octet. There are three optional octets for MCC and MNC (201-206), two mandatory TAC octets (207, 208) and one optional TAC octet (209). In the example TA-ID, there is also additional mandatory field (210) included. The fields for MCC and MNC (201-206) correspond to PLMN-ID.

International Patent Application WO2007089556, discloses a wireless communication method and system for performing dual mode paging for multi-mode terminal operation in that system. The wireless communication system includes an E-UTRAN, a 2G/3G RAN (Radio Access Network) and at least one WTRU including an EE (Evolved Element) in communication with the E-UTRAN and a 2G/3G element in communication with the 2G/3G RAN. The WTRU is reachable in the LTE system while registered in 2G/30 system, and vice versa. The system may first attempt paging the WTRU over a 2G/3G RAN, and then attempt a second page on an LTE RAN. If the WTRU receives a first page message via the 2G/3G RAN, then it may respond on the 2G/3G RAN. If the WTRU did not receive the first page because it is camping on the LTE side, then it receives the second page message via the E-UTRAN. The WTRU responds to the second page message via the EE.

International Patent Application WO2008025502A1 describes a method to balance traffic load between nearby cells and to optimize the use of radio resources in loaded WiMAX profile C and LTE environments, in which a central RRM (Radio Resource Management) function is not available. Nearby cells are grouped into constellations. Load status information is exchanged within the constellation for achieving RRM optimizations in a distributed environment in which no central RRM controller exists. In particular, cell traffic load balancing should be achieved by exchanging radio resource utilization information between base stations and by offloading busy cells via standard handover, HO, procedures, in order to prevent flooding situations. Border constellation cells are enabled to trigger traffic offloading only when the average actual traffic load of the neighbor constellation is lower than its target utilization parameter. RAN structure in which the functions of the centralized controller, e.g. the RNCs in UTRAN, are partially shifted to the base stations in order to reduce latencies and improve the quality of service, QoS, provided to the end user. Both architectures allow BS-to-BS communication for coordination purposes. LTE systems provide this via a specific interface, X2, between eNBs, while WiMAX may rely on the availability of a mediation function provided by a central controller, ASN-GW (Access Service Network Gateway) or a logic BS-to-BS interface, R8.

Haihong Zheng et al., 'Inter-RAT mobility in 802.16m,' IEEE C802.16m-08/647r1, July 2008, propose Inter-RAT handover for some radio access technologies. For W-LAN and WiMAX, mobile stations are always paged over WiMAX. A first alternative for handover between WiMAX and cdma2000 requires dual radios. A second alternative for handover between WiMAX and cdma2000 relies upon broadcast or multicast indication of neighboring target BS supporting cdma2000. After detecting the indication, the dual mode MS may switch on the secondary radio to scan for cdma2000 network based on its PRL (Preferred Roaming List) and other policies defined. The serving BS may also provide the system information of the target BS in the neighbor advertisement, which can be used by MS to access and register with the target BS. The connection with the serving BS is kept alive until the handover completes. Handover between WiMAX and 3GPP radio access technologies not requiring dual radios is also included.

Cited prior art technology for handover focuses on a small number of access technologies or centralized radio network control. In the future, it will likely not be feasible to upgrade legacy systems to adapt them to more recent technologies. With distributed networks, centralized management of network topology for a plurality of access technologies may not be available or desired. For a particular base station to distribute load over more than one access technology, capability of acquiring local information on surrounding base stations for various access technologies will then be imperative. The acquisition should be made with smallest possible capacity loss, and preferably without requiring multiple radios.

Handover of user equipment, e.g. between different wireless access technologies or frequencies, is of concern for user equipment in connected mode. A corresponding concern is due to paging of user equipment for incoming calls or data, when the user equipment is in idle mode. Acquisition of area codes for paging corresponding to acquisition of cell or base station identities is as important for paging over various access technologies or frequencies as is acquisition of cell or base station identities for active user equipment with on-going sessions or calls.

With a greater number of technologies, having user equipment to identify base stations or area codes such as location area codes and routing area codes by measuring relevant data/parameters from one or more broadcast signals in the neighborhood for all relevant access technologies may take considerable time and reduce its available communication capacity, for at least the radio used for the measurements. Dual or multi-radio user equipment suffers from high costs in terms of weight, size and power consumption. For single radio user equipment, the time period required for measurements will for most equipment require it to be in idle mode to reduce complexity and cost and to provide quality of service within specifications Prior art technology does not disclose or suggest a method or equipment efficiently providing the required information of one or more neighbor cells, particularly not in a fashion suitable also for a communications system with distributed radio network control.

SUMMARY

A method for parameter management in a wireless cellular communications system comprising a first base station and a second base station equipped for communications in the communications system comprises recording one or more paging area parameters broadcast by a base station serving a neighbor cell of a cell served by the first base station. The one or more paging area parameters thereby form part of a relation of the first base station and are maintained by the first base station. The one or more recorded paging area parameters are transformed from the first base station to the second base station. The one or more paging area parameters comprise one or more tracking area codes (TACs).

BRIEF DESCRIPTION OF THE DRAWINGS

FIG. 5 illustrates a preferred more compact representation of an exemplary record according to the embodiment.

DETAILED DESCRIPTION

Figures 1, 2:
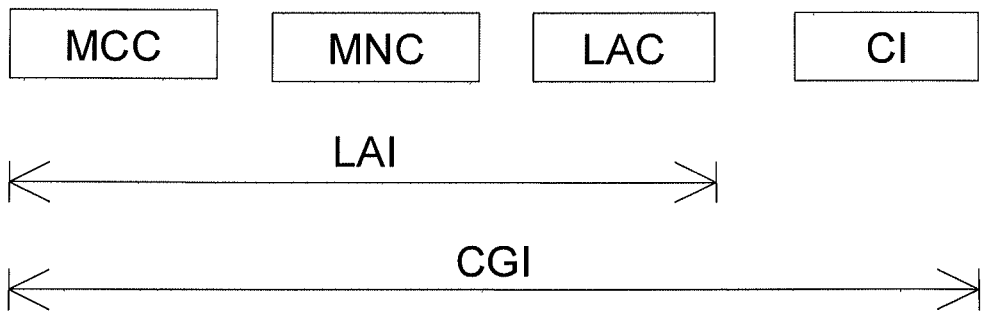
FIG. 1 illustrates cell global identification according to prior art.
FIG. 2 illustrates an example TA-ID information element according to prior art.
Figure 3:
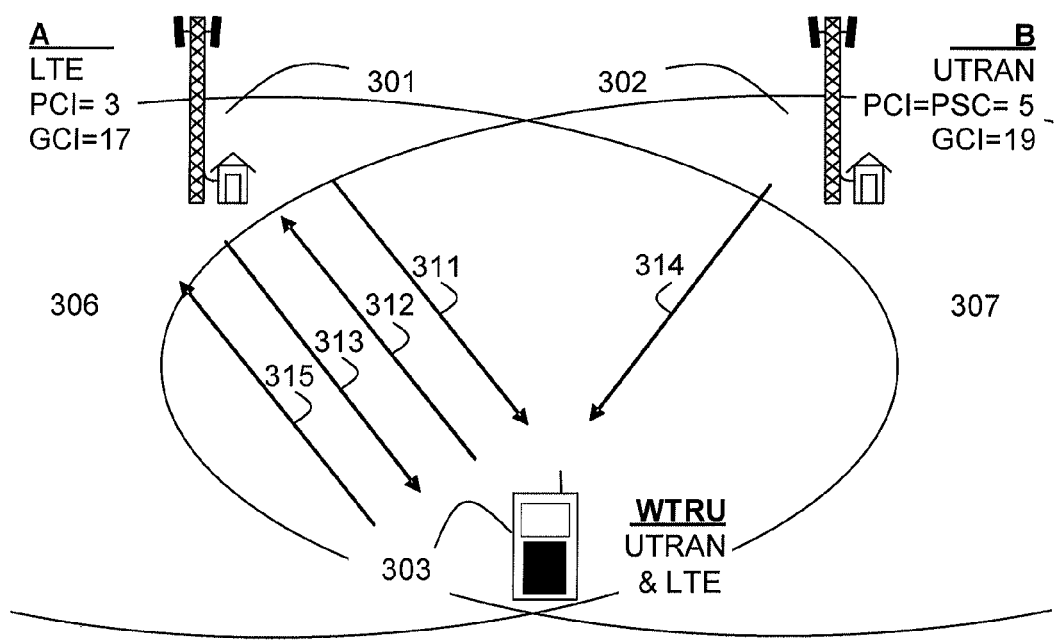
FIG. 3 illustrates schematically an inter-frequency/inter-RAT automatic neighbor relation function according to prior art.

Measurement on broadcast signals from a great number of base stations, possibly operating according to different wireless access technologies, is generally time consuming. Furthermore during time-periods when measurements are performed, available resources for communications with the system or cell on which a UE device is camping is normally reduced.

As a means to reduce the impact as much as possible, a shorter identity, PCI, was introduced in E-UTRAN as explained above. The PCI of E-UTRAN is capable of resolving 504 identities and is represented with a relatively short sequence (as compared to e.g. CGI). Thereby, it may be broadcast more frequently without consuming too much of the capacity of the broadcast channel and may be detected by a user equipment device within a relatively short time frame.

Most telecommunication systems as of today rely upon UE assisted mobility, where the UE reports mobility measurements and the network side determines when to perform a handover. The UE measurements required for the UE assisted handover are controlled by the network side, requesting measurement reports. In E-UTRAN, when a user equipment device detects a neighbor E-UTRAN cell fulfilling the report requirements, the device reports that neighbor cell to E-UTRAN using the PCI.

By the notion of a neighbor cell is referred to a cell served by a base station of which the broadcast signal for the neighbor cell can be received by a user equipment device while the device is camping on another cell served by a base station, also referred to as a serving cell. For some access technologies, such as GSM and UMTS, the neighbor cell could alternatively refer to a cell included in a particular neighbor cell list provided from a system configuration server. The scope of the concept of neighbor cell within this patent specification includes both concepts. Though, for a particular network, operating frequency and access technology, one of them applies as should be apparent for an actual network and access technology.

Due to limitations of PCI, a same PCI may be used for several cells. To reduce the risk of neighboring cells having the same PCI, E-UTRAN provides an option for a base station to prune PCIs used by neighbor cells from a list of candidate PCIs, when initially assigning a PCI to the base station or a cell thereof.

However, some of the virtue of the PCI is lost with the ANR function requiring more broadcast parameters to be detected and registered by the user equipment.

As a non-exclusive example, the maximum time allowed for synchronization to a BCCH carrier is 0.5 s, and the maximum time allowed to read the BCCH data, when being synchronized to a BCCH carrier, is 1.9 s or equal to the scheduling period for the BCCH data, whichever is greater. The MS is allowed to camp on a cell and access the cell after decoding all relevant BCCH data. BCCH is transmitted in a TDMA multi-frame structure. A 52-frames structure corresponds to 0.24 s in time. Typically, the periodicity of LAC and RAC is 0.32 s.

For inter-system or inter-RAT handover, global identities and other parameters, such as paging area parameters, required for the handover are provided over the air and need be identified and made available for a handover decision causing performance loss.

The embodiments identify the abovementioned problem and other problems related to handover between or paging in cells without being limited to a particular access technology. As a spin-off, the embodiments are also applicable within a same access technology whenever parameters reflecting system topology are required that may be tedious to acquire over the air for a distributed system. Further, with relaxed over-the-air monitoring of broadcast signaling, energy consumption of a user equipment device is reduced and battery lifetime is extended, provided everything else being equal.

Figure 4:
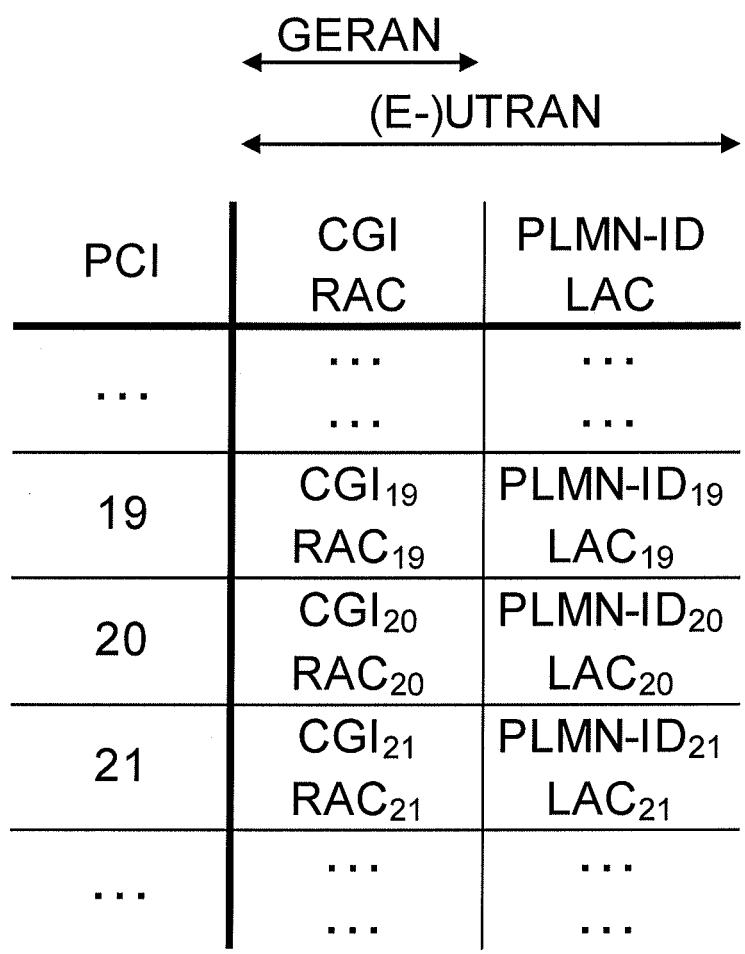
FIG. 4 illustrates an example stored record according to an embodiment.

According to an embodiment, all user equipment is measuring on neighbor cells when instructed to do so. In contrast to prior art, there will be less measurements required for the system if measurement data collected by one mobile station can be reused. This is preferably achieved by providing at least temporary storage in e.g. a base station of the collected one or more parameters together with an identifier being available without requiring extensive or tedious measurements. This at least temporary storage thereby forms a stored cell relation. For E-UTRAN, PCI is one such identifier that is readily available. A record maintained in memory or other storage means is preferably organized in a structure, where the record is addressed by the readily available identifier, such as the PCI. The record is preferably maintained on a per cell basis or a per BS basis. A record maintained on, e.g., a per cell basis has the advantage as compared to a cell relation on a basis, e.g., per communications session or connection that it can be reused for other mobile terminals than the one or more mobile terminals involved in such a communications session or connection. Further, there would be little or no reason to maintain, e.g., a per UE record by a recording base station when the UE is no longer connected or its communications session involving the recording cell/base station has ended, or it may no longer even be camping on the cell of the recording. FIG. 4 illustrates an example record covering both GERAN and UTRAN cells for some example PCIs. It is also applicable for E-UTRAN cells, replacing LAC or RAC with TAC and providing the bit allocations as necessary. As illustrated in FIG. 1, CGI for GERAN includes LAC and a PLMN-ID in terms of (MCC and) MNC, and a more compact representation for maintenance; applying irrespective of whether the access network is GERAN, UTRAN or E-UTRAN is thereby achieved as indicated in FIG. 5; where CGI* is a compact representation of CGI free of PLMN-ID and LAC. For a GERAN, a compact CGI* consequently essentially corresponds to CI or a locally unique cell identity, indicated in FIG. 5 by a symbolic dashed strike-through of G (Global). The sequential order of the compact fields is rearranged as need be. For the representation for E-UTRAN, LAC and RAC of FIG. 5 are again replaced by TAC. Preferably, the storage device such as a flash memory, soft disk or hard disk is located to a base station with distributed RRM. Due to the maintained PCI record, a recently stored record need not be acquired anew by a UE reporting a PCI corresponding to that record, unless it is outdated.

The embodiments also allow a fraction of the UE devices with multi-mode capability to be requested for doing measurements, or at least not collecting all of the required measurement data, thereby distributing the measurement load over available user equipment.

In case a user equipment device reports a PCI, or corresponding rapidly acquired identity, that is not stored in the data base, the device is requested to perform measurements for collecting relevant parameters for future use corresponding to that PCI, unless excluded e.g. by some discipline for additionally reducing overall number of measurements required.

Figure 6:
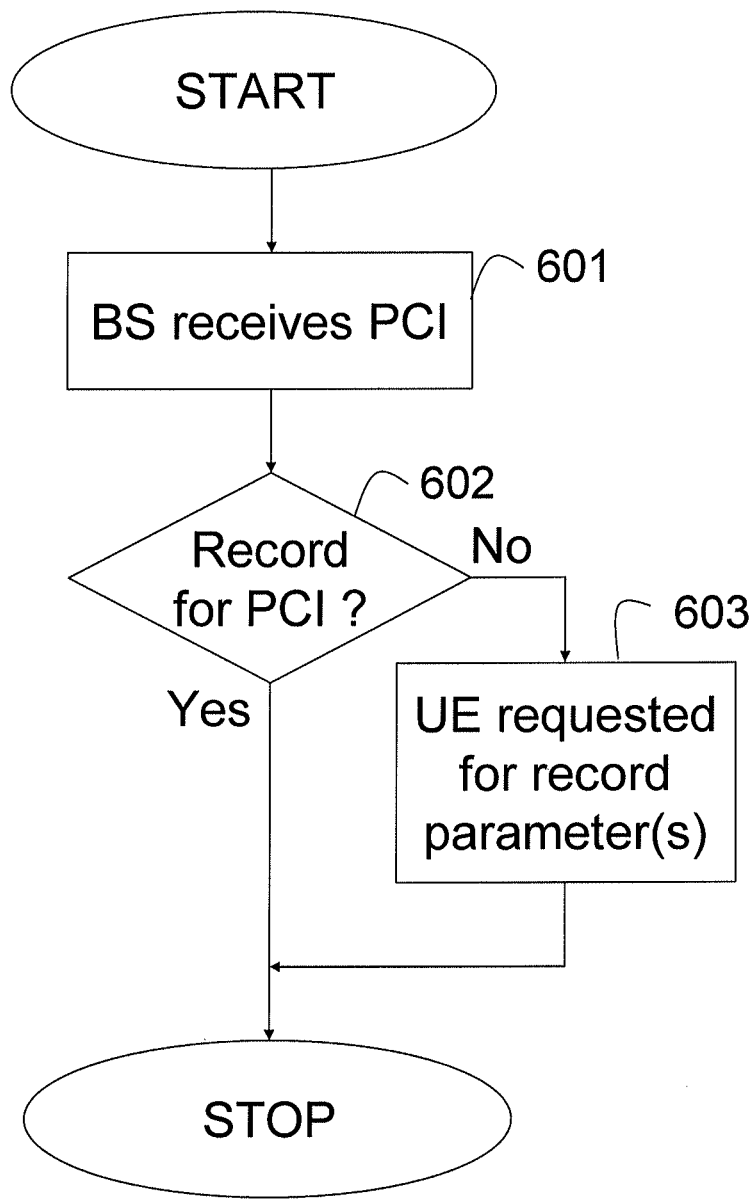
FIG. 6 displays a principal flow chart for example memory look-up and subsequent measurement(s) according to the embodiment.

A principal flow chart for an example memory look-up and subsequent measurement(s) is illustrated in FIG. 6. UE reports (601) e.g. PCI or corresponding identifier frequently transmitted by neighboring cells. The base station investigates content of memory or storage means for a parameter record corresponding to the PCI and determines (602) whether such record is available. If there is no record or the record is not complete, UE is requested (603) to collect one or more parameters. If there is a record sufficiently complete and it is not outdated, UE need not waste capacity on new measurements.

In a preferred embodiment, record data as explained in relation to FIGS. 4 and 5 is communicated between base stations. Thereby, the measurement load on user equipment is further reduced. For a radio communications system with distributed RRM, the information is preferably transferred in an interface between base stations, such as an X2 interface in E-UTRAN or R8 interface in WiMAX. It is noted that if some but not all of the parameters indicated in FIGS. 4 and 5 are recorded, while the remaining parameters are recorded as need be, the requirements on measurements are still relaxed. As a non-exclusive example, a user equipment device may read CGI of a neighboring cell upon request from a base station corresponding to the cell on which the device is camping. In case e.g. RAC is stored in the base station for this CGI, there is no need to particularly request the device to determine RAC of the neighbor cell for that CGI.

In an example embodiment, the parameter storage is grouped into two sets. Considering a particular base station, BS1, it preferably stores one set of neighbors that are found to be neighbors of BS1, and one set of neighbors that are not (yet) found to be neighbors of BS1. When receiving parameters or records of parameters of neighboring base stations, e.g., over the X2 interface in assigned one or more information elements, BS1 receives information that a parameter or record corresponds to a neighbor of the transferring base station, BS2. That base station's neighbor is not necessarily a neighbor of BS1. When transferring information to other base stations, BS1 preferably transfers parameters or records of neighbors of BS1 to other base station(s), but does not transfer parameters or records received for neighbor cell(s) of other base station(s), such as BS2, until confirmed neighbor cells also of BS1. This will reduce overall data amount required for base-station transfer and storage and improve relevance of maintained data.

Figure 8:
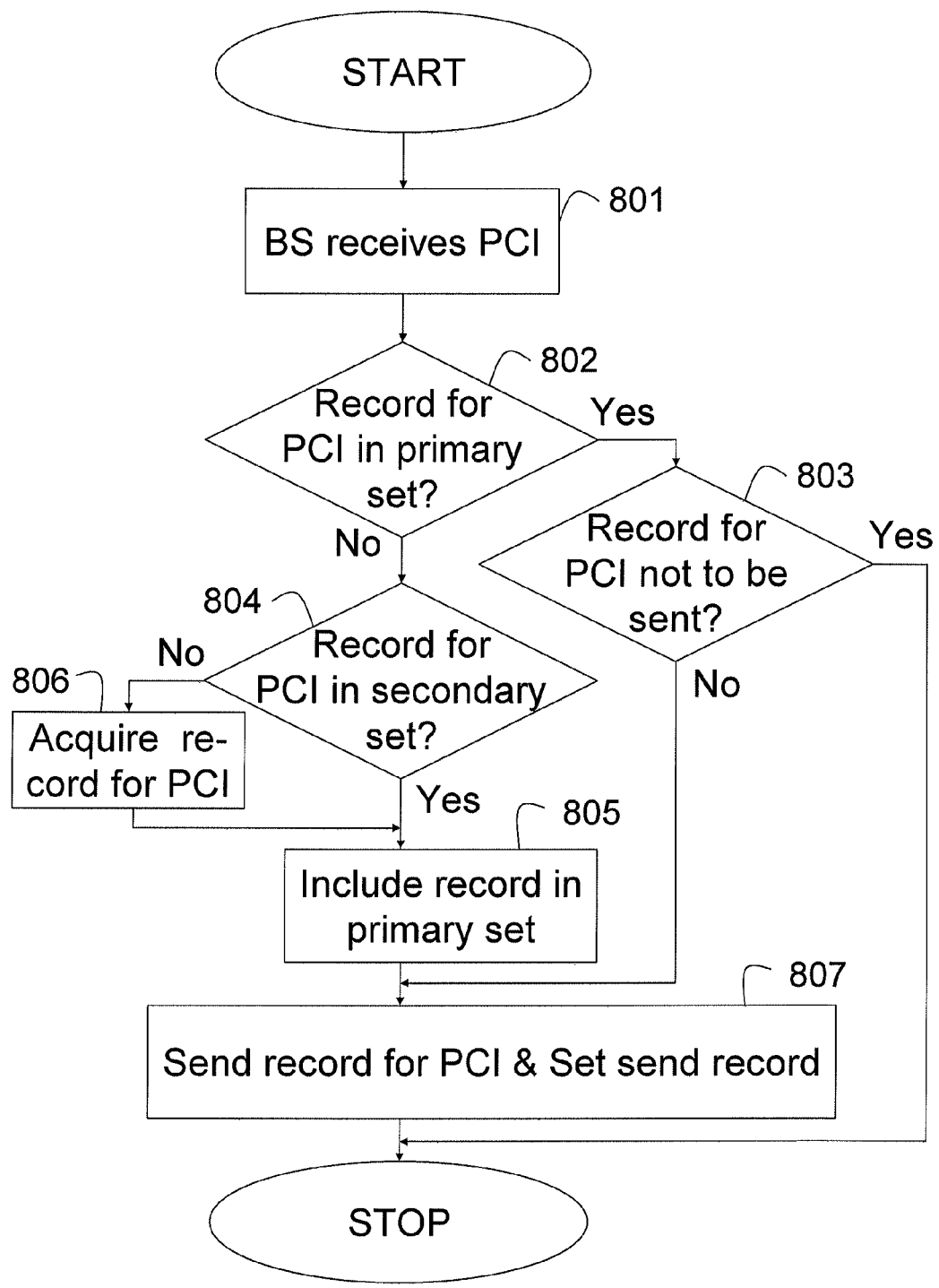
FIG. 8 illustrates schematically a flow chart of an example parameter transfer also considering two parameter sets in accordance with the embodiment.

FIG. 8 illustrates schematically a flow chart of an example parameter transfer also considering two parameter sets. Upon reception (801) of PCI or other identifier broadcast with relatively high recurrence rate, the base station investigates (802) whether there is a record for the identifier in the primary set comprising records for neighbors of the base station. In case there is such a record, it is optionally investigated (803) whether this record has been sent recently to one or more other base stations by investigating a send history record. Depending on network dynamics and outdating parameters used, the parameter may be resent despite it has been sent earlier, rendering a history record a send record of parameter records not to be sent. If the parameter record for the identifier has not been sent or it should be resent, the parameter record is transferred (807) to one or more other base stations and, optionally, the send history/record is updated (807) accordingly.

In case there is not yet any record in a primary set comprising record parameters of neighbors of the base station, BS1, the received identifier indicates that such a record should be included (805) in the set of one or more parameter records for neighbors of BS1, the primary set. In case such a record is already included (804) in a secondary set of record parameters comprising record parameters as registered in one or more primary sets of one or more other base stations, such as BS2, and transferred to the base station, BS1, receiving the identifier, this parameter record is included as a parameter record of the primary set (805) of the base station, otherwise it is acquired (806) from available network resource or over the air as need be. Of course, the inclusion in primary and secondary sets usually does not require that the records are copied. Boolean indicators indicating the inclusion in one or more sets of parameter records is an option.

As an obvious alternative to improving measurement efficiency as described above, it would be possible to install a user equipment device in a base station for the purpose of reporting neighbor environment for the various access technologies. Though in case this is installed on the same location as the base station, there is a risk that the estimated environment or network topology does not correspond to the environment or topology as experienced by a real user equipment device some distance apart from the base station. Installation of distributed user equipment devices dedicated for measurement purposes is also less desired and the load of the air interface for reporting would remain.

Figure 7:
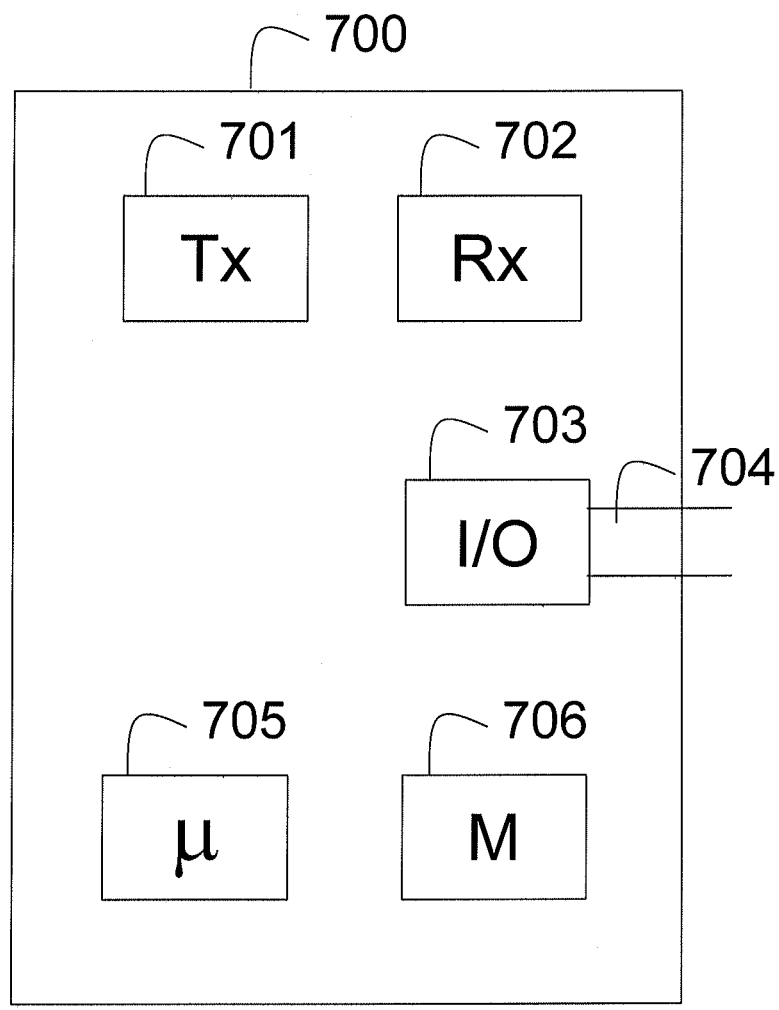
FIG. 7 illustrates a basic block diagram of a base station embodied in accordance with the embodiment.

FIG. 7 illustrates a basic block diagram of an example base station device (700) in accordance with the embodiments. The base station device (700) preferably includes transmit and receive circuitry (701, 702) to be capable of wireless communication with user equipment applying a corresponding wireless access technology or radio access technology. This includes communication of measurement reports including one or more parameters and requests for measurements or parameters. The transmitter and receiver circuitry (701, 702) is controlled by, and exchanging signals and data carried by signals with processing circuitry (705). Connected to or included with the processing circuitry (705) is some storage means (706). There may be a plurality of storage devices such as ROM (Read Only Memory), RAM (Random Access Memory), flash memory, soft disks and hard disks. There are preferably storage means allowing for storage of processing software and for various parameters, long-term storage and short-term storage. The processing circuitry also interacts with or integrates with interface circuitry (703, 704). The interface circuitry preferably includes active circuitry (703), e.g. including driver circuitry for transmit and receive data, buffer circuitry and supplementary processing circuitry. The active interface circuitry (703) or processing circuitry (705) preferably is adapted for its operation and exchange of information with other base station devices or base stations according to some defined interface, e.g. X2 or R8, by inclusion of dedicated software.

Various units of block diagrams or schematic diagrams (301-303, 701, 703) representing active communication equipment comprise processing circuitry. Processing equipment includes hardware or software, not excluding both hardware and software. The respective processing equipment of various units preferably operates according to one or more computer program products stored in storage means of the various units or of one or more connected units for storage.

In this description, certain acronyms and concepts widely adopted within the technical field have been applied in order to facilitate understanding. The claims are not limited to units or devices due to being provided particular names or labels. The claims applies to all methods and devices operating correspondingly. This also holds in relation to the various systems that the acronyms might be associated with.

While various specific embodiments have been described, it will be understood that the embodiments may be further modified. This specification is intended to cover any variations, uses, adaptations or implementations of the claims; not excluding software enabled units and devices, processing in different sequential order where non-critical, or mutually non-exclusive combinations of features or embodiments; within the scope of subsequent claims following, in general, the principles of the claims as would be obvious to a person skilled in the art to which the claims pertain.

What is claimed is:

1. A method for parameter management in a wireless cellular communications system comprising a first base station and a second base station equipped for communications in the communications system, the method comprising:
    recording one or more paging area parameters broadcast by a base station serving a neighbor cell of a cell served by the first base station, the one or more paging area parameters thereby forming part of a relation of the first base station and are maintained by the first base station,
    recording the one or more paging area parameters as a function of cell or base station identity of the neighbor cell, wherein the cell or a base station identity is broadcasted with a higher repetition frequency than the one or more paging area parameters; and
    transferring the one or more recorded paging area parameters from the first base station to the second base station;
    wherein the one or more paging area parameters comprise one or more tracking area codes (TACs).

2. The method according to claim 1, wherein the one or more paging area parameters are maintained on a basis per cell or per base station.

3. The method according to claim 1, comprising
    receiving the one or more paging area parameters over an interface between user equipment and the first base station.

4. The method according to claim 1, wherein the transferring is over a base station-to base station (BS-to-BS) interface.

5. The method according to claim 1, comprising
    establishing in the second base station at least two sets of one or more parameter records forming part of a cell-relation, wherein a first set of one or more parameter records includes parameters transferred to it from the first base station or other base stations and a second set of one or more parameter records includes one or more parameter records of respective one or more base stations serving neighbor cells of the cell served by the second base station.

6. The method according to claim 1, wherein Public Land-Mobile Network-identity (PLMN-identity) of the base station serving a neighbor cell, or PLMN-identity of the neighbor cell, is transferred from the first base station to the second base station included in a list of one or more PLMN identities.

7. The method according to claim 1, wherein the one or more paging area parameters comprise at least one of: a paging area, apaging group, a location area code, a routing area code, and a tracking area code.

8. The method according to claim 1, wherein the base station serving a neighbor cell applies an access technology different from the access technology of the first base station or the second base station.

9. The method according to claim 8, comprising
transferring a cell global identity of recorded one or more neighbor cells or one or more base stations serving the one or more neighbor cells from the first base station to the second base station.

10. An apparatus for parameter management in a wireless cellular communications system, the device being equipped for communications in one or more cells of the cellular communications system, the device comprising
storage circuitry configured to maintain:
a record of one or more paging area parameters broadcast by a base station, the one or more paging area parameters thereby forming part of a wireless cell relation of the device in relation to one or more neighbor cells,
a record of the one or more paging area parameters as a function of cell or base station identity of the neighbor cell, wherein the cell or a base station identity is broadcasted with a higher repetition frequency than the one or more paging area parameters;
interface logic configured to facilitate paging area parameter transfer to a base station, and
processing circuitry configured to record by the storage circuitry one or more paging area parameters broadcast by a base station of a neighbor cell and for transferring the one or more recorded paging area parameters over the interface logic.

11. The apparatus according to claim 10, comprising
transmit and receive circuitry configured to exchange information according to a wireless access technology, and processing circuitry adapted for recording of the one or more paging area parameters over the wireless access technology.

12. The device according to claim 10, wherein the interface logic is adapted for a particular BS-to-BS interface.

13. A computer program product comprising a non-transitory computer readable medium storing program code there on for use by a base station for parameter management, the program code comprising instructions for executing a method that comprises:
recording and one or more paging area parameters of a neighbor cell of a cell served by the base station;
recording the one or more paging area parameters as a function of cell or base station identity of the neighbor cell, wherein the cell or a base station identity is broadcasted with a higher repetition frequency than the one or more paging area parameters, and
transferring the one or more recorded paging area parameters from the base station to a second base station;
wherein the one or more paging area parameters are one or more tracking area codes (TACs).

* * * * *